June 23, 1959    B. E. FRANKLIN, JR., ET AL    2,891,481
BATTERY ACTUATED FUEL PUMP
Filed Feb. 19, 1957
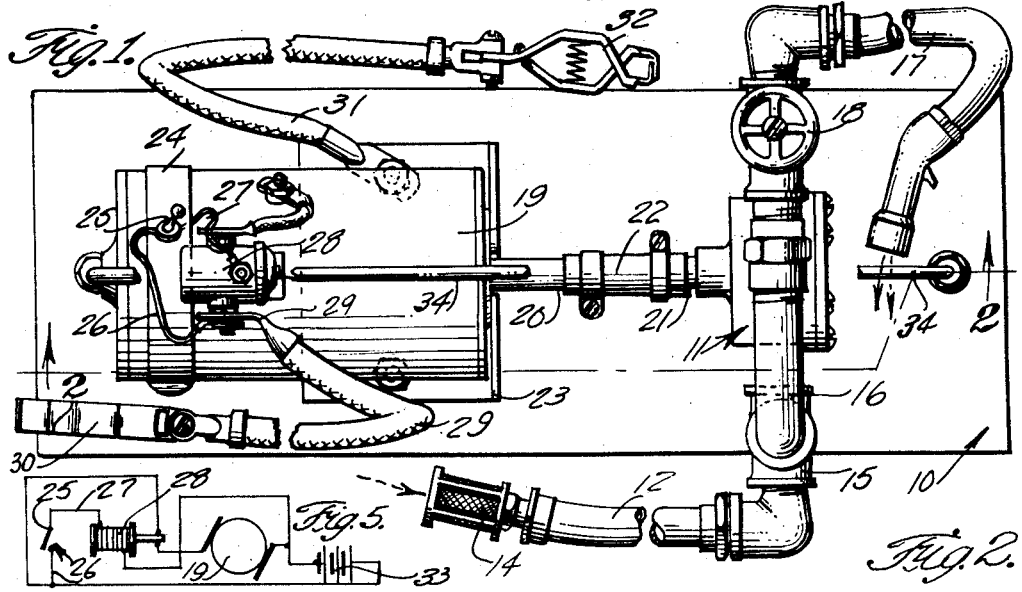
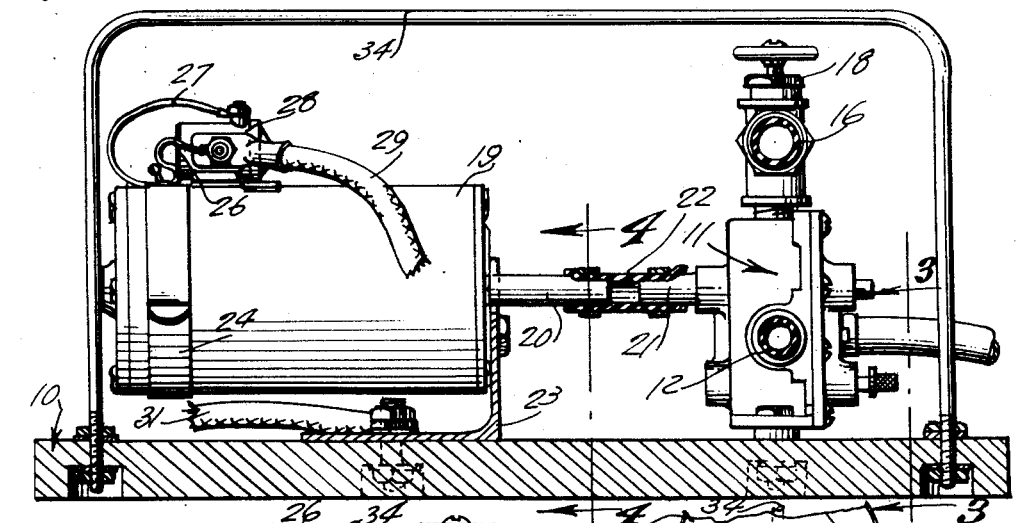
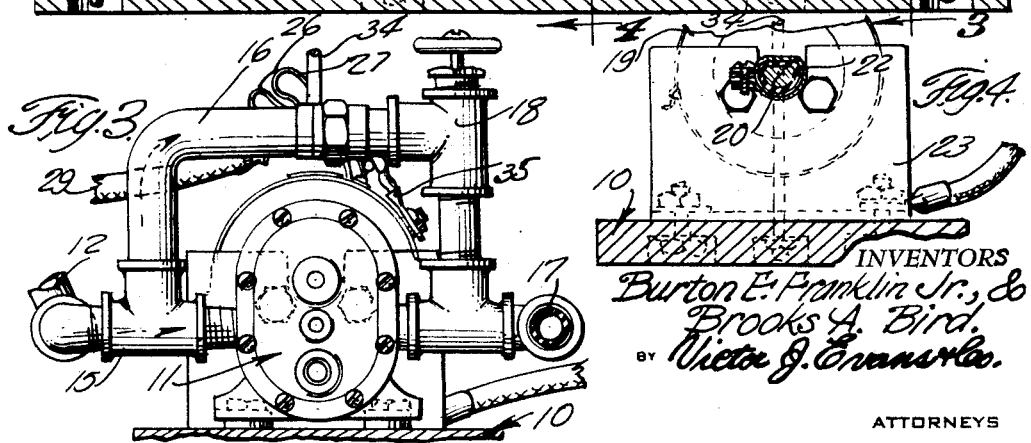
INVENTORS
Burton E. Franklin Jr., &
Brooks A. Bird.
BY Victor J. Evans & Co.
ATTORNEYS United States Patent Office 2,891,481
Patented June 23, 1959

2,891,481

BATTERY ACTUATED FUEL PUMP

Burton E. Franklin, Jr., and Brooks A. Bird, Metter, Ga.; said Bird assignor to said Franklin Application February 19, 1957, Serial No. 641,171

2 Claims. (Cl. 103—41)

This invention is related to a pump, and more particularly to a fluid pump which is adapted to be actuated by a battery.

The object of the invention is to provide a device for pumping fluid such as fuel, whereby the pump can be driven by a motor that is actuated by a storage battery.

Another object of the invention is to provide a portable pump which can be used in locations that are not equipped with ordinary sources of electrical energy so that the assembly can be actuated by a storage battery such as the battery of a truck or automobile.

A further object of the invention is to provide a battery actuated fuel pump which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the battery actuated fuel pump, constructed according to the present invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 2.

Figure 5 is a view illustrating the wiring arrangement for the present invention.

Referring in detail to the drawings, the numeral 10 designates a base or platform which can be made of any suitable material such as wood, and the base 10 can be supported on the bed of a truck body or the like. Secured to the base 10 is a pump 11, and connected to one side of the pump 11 is a suction line or hose 12 which has a strainer 14 connected thereto for preventing foreign matter from entering the line 12. A T-fitting 15 may be connected to the line 12, and a by-pass line 16 leads from the fitting 15 to a discharge line 17. A pressure regulating valve 18 may be arranged in the by-pass line 16, Figure 3.

There is further provided an electric motor 19 of conventional construction which serves to rotate a drive shaft 20, and the drive shaft 20 is connected to a driven shaft 21 through the medium of a flexible coupling or sleeve 22. The driven shaft 21 is connected to the pump 11. The motor 19 may be supported by a metal or electrically conductive support member 23.

Mounted on an end of the motor 19 is a bracket 24 which provides a support for a manually operable switch 25, and wires 26 and 27 are connected to the switch 25. A solenoid type switch 28 may also be supported above the motor 19 and a pair of cables 29 and 31 are provided for connecting the motor and its associated parts to a storage battery 33. The cable 29 may have a clamp 30 and the cable 31 may have a clamp 32 whereby these clamps 30 and 32 can be arranged in engagement with the terminal posts of the battery 33. A handle member 34 may be secured to the base 10 whereby the entire assembly can be readily moved from place to place as desired. A wire 35 may lead from the solenoid switch 28 to the motor 19.

From the foregoing it is apparent that there has been provided a portable pumping assembly which can be operated even when it is located away from ordinary sources of electrical energy since the motor 19 can be operated by means of a storage battery similar to those used in automobiles or trucks. In use, the base 10 can be supported on a truck or other vehicle and then transported to the desired location. Then, the inlet suction line 12 can be arranged in engagement with the fluid to be pumped such as gasoline and then when the switch 25 is turned on, the motor 19 will be actuated. Previously, the clamps 30 and 32 are arranged in engagement with the terminal posts of the battery 33 so that the motor 19 will be energized. Energization of the motor 19 rotates the shaft 20 and this in turn rotates the shaft 21 through the medium of the sleeve 22. As the shaft 21 rotates it operates the pump 11 so that the fuel or other fluid will be sucked up through the hose 12 and will be discharged out through the conduit or hose 17 to any suitable locality. By regulating the valve 18 the amount of fluid flowing through the by-pass line 16 can be varied as desired.

The present invention can be used for pumping any fluid or suitable material such as grease or gasoline. The pump 11 may be a direct flow self-priming pump and the handle 34 can be used for carrying the entire assembly. The motor 19 may be a 6-volt motor and the battery 33 can be a 6-volt capacity type. The switch 25 permits the entire assembly to be turned on and off after the device has been connected to the power supply or battery. Thus, the solenoid 28 will break the circuit as shown in Figure 5 when the switch 25 is turned off.

We claim:

1. In a pumping assembly, a horizontally disposed base, a pump mounted on said base and secured thereto, a suction hose connected to one side of said pump, a discharge line connected to said pump, a by-pass line extending between said suction hose and discharge line, a motor mounted on said base, a drive shaft extending from said motor, a driven shaft spaced from said drive shaft and connected to said pump, a flexible coupling interconnecting said drive shaft and driven shaft together, a bracket mounted on said motor, a manually operable switch secured to said bracket, a solenoid switch spaced from said manually operable switch and electrically connected thereto, a first cable extending from said solenoid, a battery connected to said first cable, a wire connecting said solenoid to said motor, a support member connected to said motor, and a second cable extending from said support member to said battery, and a strainer on the end of said suction hose.

2. In a pumping assembly, a horizontally disposed base, a pump mounted on said base and secured thereto, a suction hose connected to one side of said pump, a discharge line connected to said pump, a by-pass line extending between said suction hose and discharge line, an electric motor mounted on said base, an electrically conductive support member connected to said motor, a drive shaft extending from said motor, a driven shaft spaced from said drive shaft and connected to said pump, a flexible coupling interconnecting said drive and driven shafts together, a bracket mounted on said motor, a manually operable switch secured to said bracket, a solenoid switch spaced from said manually operable switch and electrically connected thereto, a first cable extending from said solenoid, a battery connected to said first cable, a wire connecting said solenoid to said motor, a support member connected to said motor, a second cable extending from said support member to said battery, a strainer on the end of said suction hose, and a pressure regulating valve in said by-pass line.

References Cited in the file of this patent

UNITED STATES PATENTS

| | | |
|---|---|---|
| 200,405 | Mendenhall | Feb. 19, 1878 |
| 1,286,527 | Burton et al. | Dec. 3, 1918 |
| 2,110,662 | Fisher | Mar. 8, 1938 |
| 2,664,052 | Schmidt | Dec. 29, 1953 |
| 2,739,537 | Sadler et al. | Mar. 27, 1956 |

FOREIGN PATENTS

| | | |
|---|---|---|
| 207,307 | Switzerland | Jan. 16, 1940 |